UNITED STATES PATENT OFFICE.

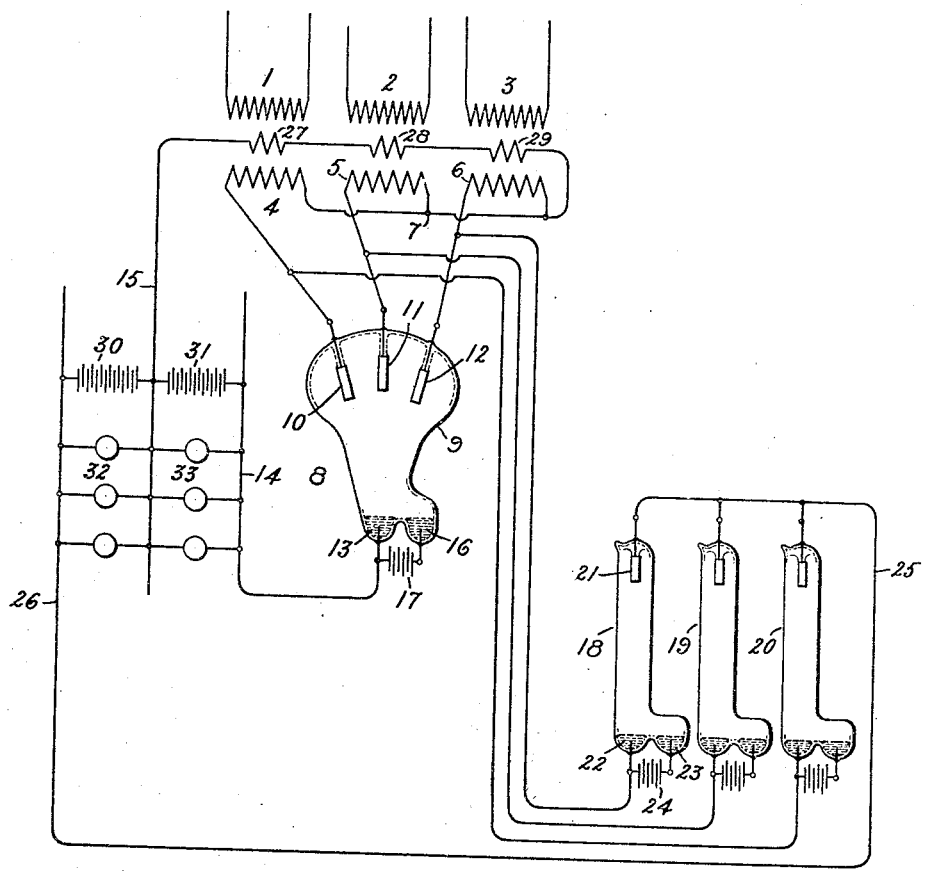

CHARLES P. STEINMETZ, OF SCHENECTADY, NEW YORK, ASSIGNOR TO GENERAL ELECTRIC COMPANY, A CORPORATION OF NEW YORK.

ALTERNATING-CURRENT-RECTIFYING APPARATUS.

No. 930,997.     Specification of Letters Patent.     Patented Aug. 10, 1909.

Original application filed March 23, 1903, Serial No. 149,112. Divided and this application filed April 30, 1904. Serial No. 205,652.

*To all whom it may concern:*

Be it known that I, CHARLES P. STEINMETZ, a citizen of the United States, residing at Schenectady, county of Schenectady, State of New York, have invented certain new and useful Improvements in Alternating-Current-Rectifying Apparatus, (division of my application Serial No. 149,112, filed March 23, 1903,) of which the following is a specification.

My invention relates to the rectification of alternating current and comprises means whereby current either of high or low voltage may be rectified without the use of any apparatus with moving parts.

My invention contemplates more especially the rectification of multiphase alternating currents, though it is to be understood that certain of its features of novelty are applicable also to single phase alternating current systems. When the rectification of multiphase alternating current is undertaken, I provide selective circuits each receiving a series of current impulses of a single polarity. Half waves of the same polarity I combine to produce a more or less uniform resulting current. Since one selective circuit or set of circuits utilizes waves of one polarity while another selective circuit or set of circuits utilizes waves of the opposite polarity, I am enabled to employ to better advantage the generating capacity of the supply system.

For a more detailed understanding of my invention reference is to be had to the following specification taken in connection with the accompanying drawings representing one embodiment of my invention.

The novel features which characterize my invention I have pointed out with particularity in the appended claims.

The rectifying system shown in the drawings provides, among other features, for utilizing both polarity waves of current derived from an inter-connected set of windings, such for example as Y-connected three-phase transformer secondaries.

In the drawings, the windings 1, 2, and 3 represent the primaries of a set of transformers receiving energy from some suitable source of three-phase alternating current. The corresponding secondary windings are indicated at 4, 5, and 6, and are Y-connected, or in other words have one terminal of each connected to a common point as 7.

In order to rectify the current from the secondary windings and to utilize both polarity waves produced thereby, I provide two sets of rectifying apparatus, one set for receiving waves of one polarity and the other set for receiving waves of the opposite polarity.

One rectifying apparatus is indicated at 8 and consists, as shown, of an exhausted envelop or container 9 provided with electrodes. Of these electrodes, three are located in the upper portion of the container as at 10, 11 and 12 and may consist of bodies of carbon, graphite, iron or the like. By means of suitable leading-in conductors the electrodes are connected respectively to the free ends of the secondary windings 4, 5, and 6. The electrodes already referred to operate as positive electrodes or anodes. With these electrodes coöperates a mercury electrode or cathode 13 electrically connected to one side 14 of a three-wire system the neutral 15 of which is connected to the junction of neutral point 7 of the Y-connected secondaries 4, 5 and 6. A mercury starting electrode 16 coöperates with the cathode 13 for the purpose of producing a starting arc in the rectifier. The energy for supplying this starting arc may be derived from any suitable source of direct current, such for example as a small storage battery 17 connected with its positive terminal to the electrode 16 and its negative terminal to the electrode 13. Upon tipping the rectifier 8 so as to cause mercury to flow between the two mercury electrodes, and then tipping back the rectifier so as to cause the mercury to separate between the electrodes, a starting arc is produced which is of such polarity as to make electrode 13 negative. The excitation of the negative electrode or cathode thus produced enables positive waves of current to flow from the positive electrodes 10, 11 and 12 through the rectifier, thus producing an overlapping series or sequence of current waves which are combined and fed to the three-wire system. The rectifier 8, however, utilizes waves of one direction only and discards waves of the opposite polarity. In order to utilize these latter waves I provide rectifying devices of such character as to receive negative waves from the windings 4, 5, and 6. For this purpose I may employ various types of rectifying devices, as for example single-phase, side branch rectifiers as indicated at 18, 19 and 20. Each of these rectifiers consists of an exhausted container provided with main positive and negative electrodes and a positive side branch electrode. Thus in the rectifier 18 the main positive electrode is indicated at 21, the negative or cathode at 22, and the side branch electrode at 23. A battery or similar source of direct current is used for creating a continually flowing arc stream or current between the electrodes 23 and 22. This side branch or arc is in existence all the time and permits current, when in the proper direction, to flow from the positive electrode 21 to the negative electrode 22, but does not permit the flow of current in the reverse direction. The other rectifiers 19 and 20 are of similar construction to that described and therefore require no further mention. These single-phase rectifiers 18, 19 and 20 are connected to the free ends or leads of the secondary windings 4, 5 and 6, but, unlike the rectifier 8, are connected with their negative electrodes to these leads rather than the positive electrodes. The positive electrodes of the single-phase rectifiers are all connected together and to a lead 25 going to the other side 26 of the three-wire system. Under these conditions it will be noted that all the positive waves of current go to the rectifier 8 and all the negative waves to the multiple rectifiers or devices 18, 19 and 20.

It will be evident that when the loads on the two sides of the three-wire system are equal no current will flow over the neutral conductor 15. When, however, the loads become unequal current will return to the neutral of the Y-connected secondaries and in doing so will traverse counter magnetizing coils 27, 28 and 29 on the three transformers, thus producing magnetizing effects which will counter-balance the uni-directional magnetization of the secondaries 4, 5 and 6 due to the inequality of the waves of one polarity with respect to the waves of opposite polarity. This has the effect of preventing excessive magnetizing currents in the transformers.

The load on the three wire system may be of any desired character, such for example as storage batteries 30 and 31 and lamps or other devices 32 and 33. As before stated, when the loads on the two sides of the three-wire system are equal there will be no return flow of current through the neutral conductor 15. In this case one rectifying apparatus will provide return circuits for the other, as the case may be.

It will be evident that numerous changes may be made in the embodiment of my invention without departing from the spirit thereof for which reason I do not wish to be limited to the devices shown and described.

What I claim as new and desire to secure by Letters Patent of the United States, is,—

1. The combination of a vapor rectifying device, current generating windings for applying the waves of current of one polarity only to said rectifying device, and counter-magnetizing coils traversed by direct current produced by the rectifier.

2. The combination of transformer windings connected so as to have a point of neutral potential, a vapor rectifying device receiving from said windings current waves of one polarity, and counter-magnetizing coils for the respective secondaries traversed by current from said rectifier.

3. The combination with a three-phase source having a point of neutral potential, of a vapor rectifying device connected to said source and receiving unidirectional current impulses therefrom, and counter-magnetizing coils for said source connected to said neutral point and receiving current from said rectifier.

4. The combination of transformer windings connected to a point of neutral potential, a vapor rectifying device receiving current waves of one polarity from said windings, a three-wire consumption circuit supplied with current by said rectifier, a neutral for said three-wire circuit, and counter-magnetizing coils for said transformer windings connected between the neutral point of said windings and the neutral of said distribution circuit.

5. The combination of a plurality of transformer windings connected to a common neutral point and traversed by current impulses of one polarity, a vapor rectifier receiving said current, a consumption circuit connected therewith, and counter-magnetizing coils for said windings traversed by said uni-directional impulses.

In witness whereof, I have hereunto set my hand this 29th day of April, 1904.

CHARLES P. STEINMETZ.

Witnesses:
BENJAMIN B. HULL,
HELEN ORFORD.